United States Patent
Maron et al.

(10) Patent No.: US 8,185,287 B2
(45) Date of Patent: May 22, 2012

(54) METHOD FOR THE OPERATION OF AN ELECTROMECHANICALLY OPERABLE PARKING BRAKE

(75) Inventors: Christof Maron, Kelkheim (DE); Jürgen Völkel, Frankfurt/M. (DE); Bernd Neitzel, Neu-Isenburg (DE); Rainer Klusemann, Frankfurt/M. (DE); Oleg Bauer, Gießen (DE); Axel Büse, Oberursel (DE); Andreas Kohl, Mainz (DE); Samir Attayebi, Frankfurt/M. (DE); Thomas Bauer, Frankfurt/M. (DE)

(73) Assignee: Contintal Teves AG & Co. oHG (DE)

( * ) Notice: Subject to any disclaimer, the term of this patent is extended or adjusted under 35 U.S.C. 154(b) by 463 days.

(21) Appl. No.: 12/373,959

(22) PCT Filed: Jul. 31, 2007

(86) PCT No.: PCT/EP2007/057869
§ 371 (c)(1),
(2), (4) Date: Apr. 1, 2009

(87) PCT Pub. No.: WO2008/017613
PCT Pub. Date: Feb. 14, 2008

(65) Prior Publication Data
US 2010/0010719 A1   Jan. 14, 2010

(30) Foreign Application Priority Data

Aug. 7, 2006  (DE) .......................... 10 2006 037 098
Aug. 7, 2006  (DE) .......................... 10 2006 037 100

(51) Int. Cl.
*B60T 13/74*   (2006.01)
*F16D 65/34*   (2006.01)
*G06F 19/00*   (2006.01)

(52) U.S. Cl. ........ 701/70; 701/29.1; 188/156; 188/72.7; 303/20

(58) Field of Classification Search ............ 701/70, 701/36, 29, 1; 188/156, 158, 162, 265; 303/20, 303/114.1, 122.02; 318/139
See application file for complete search history.

(56) References Cited

U.S. PATENT DOCUMENTS

| 4,895,227 | A | 1/1990 | Grenier et al. |
| 6,318,513 | B1 * | 11/2001 | Dietrich et al. ............. 188/72.7 |
| 6,471,017 | B1 * | 10/2002 | Booz et al. .................... 188/72.7 |
| 7,143,873 | B2 * | 12/2006 | Pascucci et al. ............. 188/72.7 |
| 7,227,324 | B2 | 6/2007 | Erben et al. |
| 7,431,133 | B2 * | 10/2008 | Maron et al. .................. 188/162 |
| 2005/0006948 | A1 * | 1/2005 | Friesen ............................. 303/20 |

FOREIGN PATENT DOCUMENTS

| DE | 103 61 042 B3 | 5/2005 |
| DE | 103 56 096 A1 | 6/2005 |
| DE | 10 2004 060 454 A1 | 6/2006 |
| DE | 10 2006 031 329 A1 | 2/2007 |
| EP | 0 235 035 | 9/1987 |
| WO | WO 2004/022394 A1 | 3/2004 |
| WO | WO 2006/024635 | 3/2006 |

* cited by examiner

Primary Examiner — Tan Q Nguyen
(74) Attorney, Agent, or Firm — RatnerPrestia

(57) ABSTRACT

An electromechanically actuable parking brake for motor vehicles is disclosed. The brake includes at least one electromechanical actuator whose rotational movement is converted into a translational movement by an actuating unit, and which moves at least one brake element in such a way that at least one brake lining which is connected to the brake element is pressed with a locking force against a rotor which is connected to a motor vehicle wheel, wherein the current consumption of electromechanical actuator when the parking brake is engaged and/or released can be acquired. Furthermore, a method for operating the electromechanically actuable parking brake is also disclosed.

13 Claims, 4 Drawing Sheets

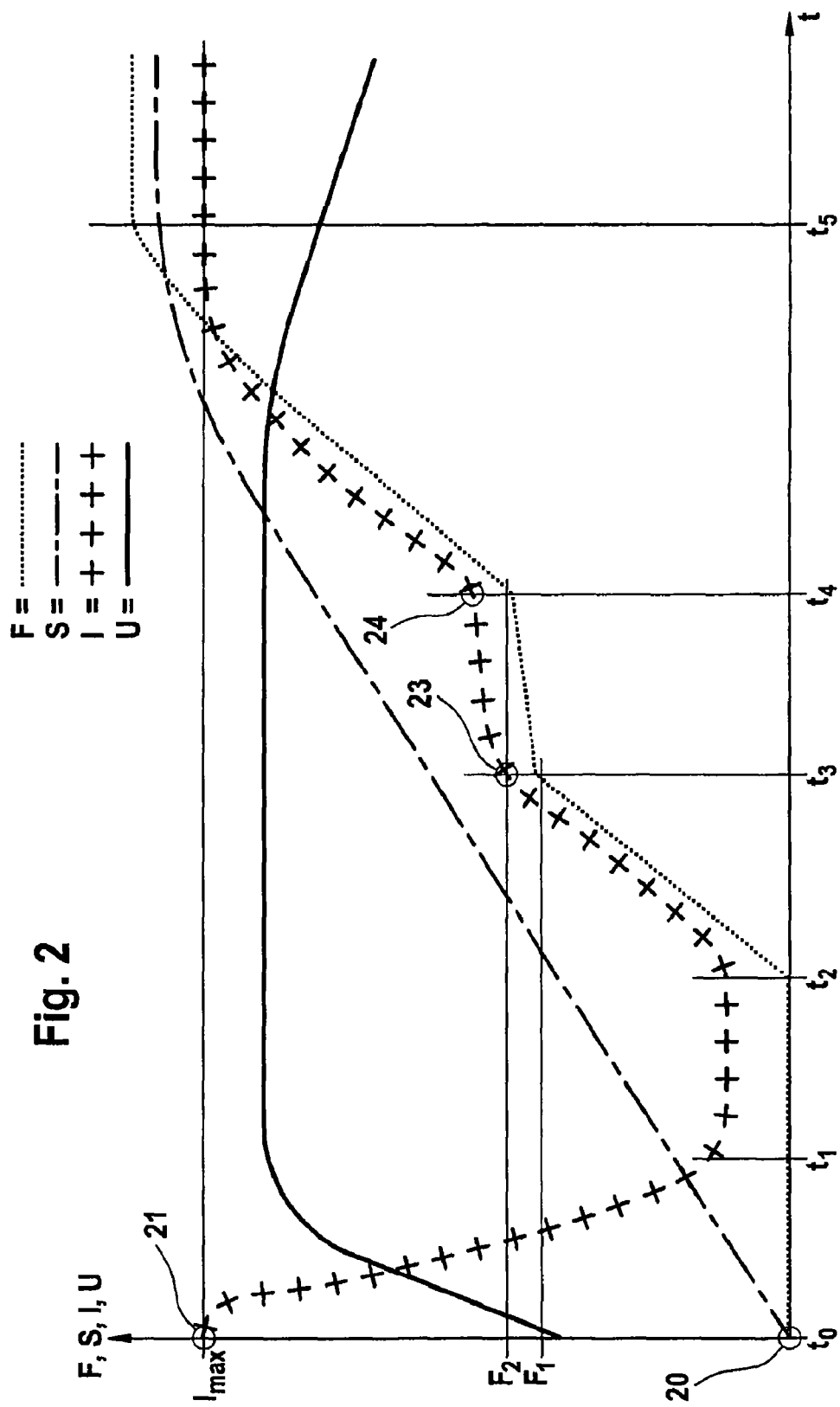

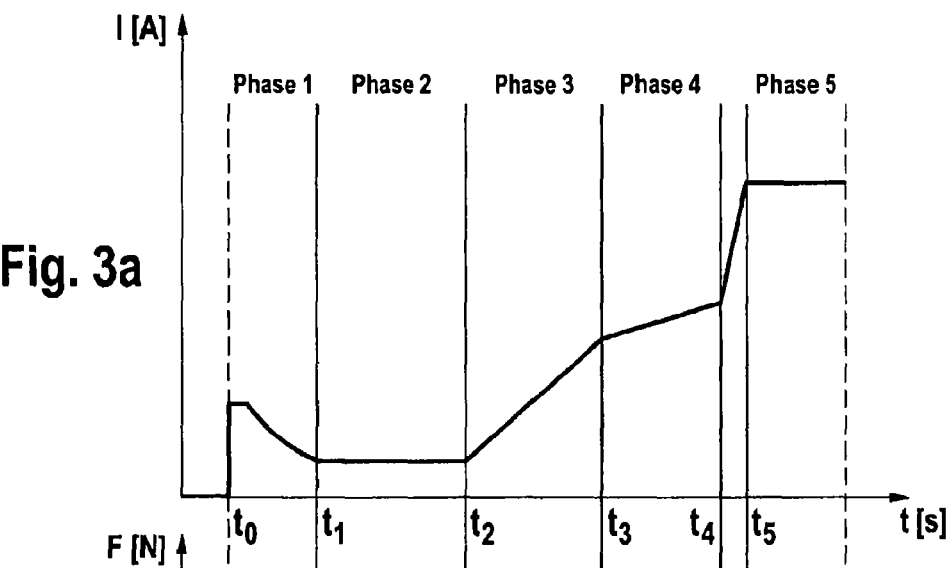
Fig. 3a
Fig. 3b
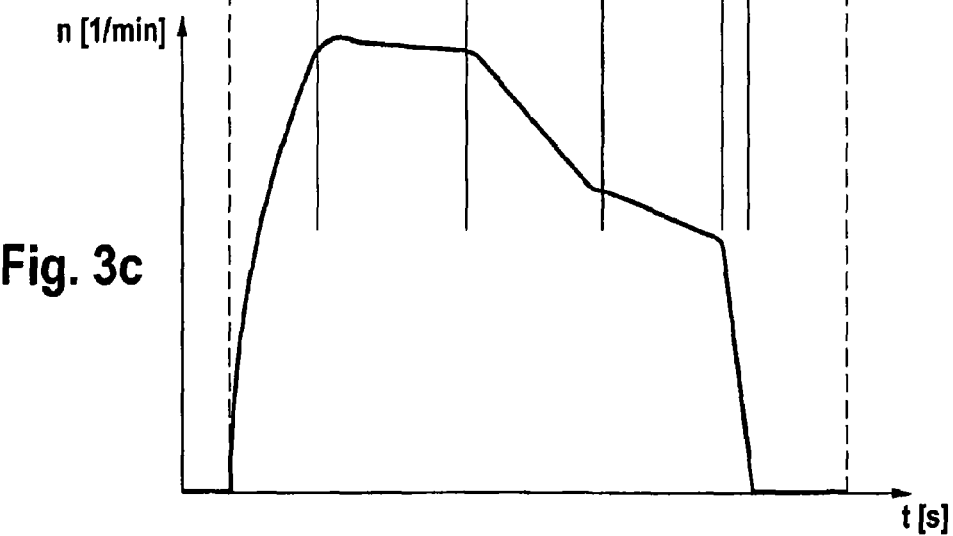
Fig. 3c

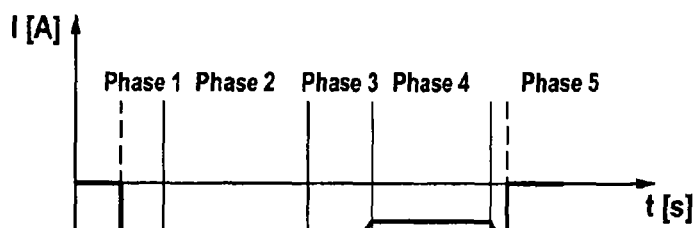
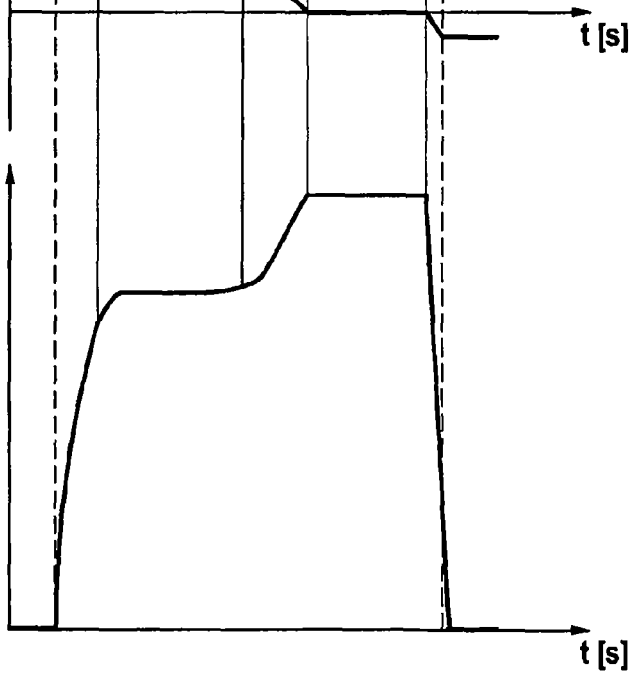

METHOD FOR THE OPERATION OF AN ELECTROMECHANICALLY OPERABLE PARKING BRAKE

CROSS REFERENCE TO RELATED APPLICATIONS

This application is the U.S. national phase application of PCT International Application No. PCT/EP2007/057869, filed Jul. 31, 2007, which claims priority to German Patent Application No. DE102006037100.3, filed Aug. 7, 2006 and German Patent Application No. DE102006037098.8, filed Aug. 7, 2006, the contents of such applications being incorporated by reference herein.

BACKGROUND OF THE INVENTION

1. Field of the Invention

The present invention relates to an electromechanically actuable parking brake for motor vehicles.

2. Description of the Related Art

The present invention relates to an electromechanically actuable parking brake for motor vehicles having at least one electromechanical actuator whose rotational movement is converted into a translational movement by an actuating unit, and which moves at least one brake element in such a way that at least one brake lining which is connected to the brake element is pressed with a locking force against a rotor which is permanently connected to a motor vehicle wheel, wherein the current consumption of the electromechanical actuator when the parking brake is engaged and/or released can be acquired. Furthermore, the invention relates to a method for operating the electromechanically actuable parking brake.

A general objective of previously known methods of an electromechanically actuable parking brake has been to set a sufficient locking force as precisely as possible. For a sufficient locking force, generally at least a force level which is sufficient to hold the motor vehicle with permissible overall weight securely and continuously on an incline with a 30% gradient. For this purpose, the measurement variable "current" with which the electromechanical actuator is operated is available as a current/time profile. If further measurement variables, for example a rotary transducer value of the electromechanical actuator or the adjustment travel carried out are available, this information can be used to increase the actuating accuracy. However, this additional information is frequently not available since this additional information entails additional costs owing to the further sensors which are necessary for these further measurement variables.

DE 10 2004 60 454 A1 discloses a method and a device for actuating a parking brake system for vehicles. The parking brake system has an electromotively actuable actuating unit for putting on or releasing the parking brake. In order to put the brake on, a defined locking force is predefined and stored in a non-volatile fashion. When the parking brake system is actuated, a current sensor outputs a signal when a defined current intensity is reached. This signal serves to operate the parking brake system, that is to say for example to switch off the motor drive when a predetermined current value is reached which corresponds to a specific value of the locking force. The problem with such current control is that absolute current values are acquired. The absolute current value which corresponds to a specific value of the locking force is, however, heavily dependent on the temperature of the surroundings, i.e. a current value which corresponds to a sufficient locking force at a temperature of the surroundings of 20% C does not at all correspond to a sufficient locking force at −10% C.

SUMMARY OF THE INVENTION

An object of the present invention is therefore to improve a parking brake system of the generic type mentioned at the beginning and a method for operating it to the effect that safe operation and reliable setting of the parking brake are made possible independently of the temperature of the surroundings and only on the basis of the acquired current consumption of the electromechanical actuator.

This object is achieved according to aspects of the invention in that means are provided which change the current consumption of the electricomechanical actuator in such a way that values of the locking force which are determined in advance can be acquired. The means are embodied in such a way that they bring about a significant change in the current consumption of the electromechanical actuator when the parking brake is engaged or released, which significant change permits a value of the locking force which was determined in advance to be inferred.

In one advantageous development, the means are formed by at least one prestressed spring element which influences the rigidity of the parking brake. In one preferred development, the at least one spring element is embodied as a prestressed disk spring package in the force flux of the parking brake or as a prestressed torsion spring in the torque flux of the parking brake.

Alternatively, the means are formed by at least one slip clutch.

This object of the present invention is achieved according to the method in that the current consumption of the electromechanical actuator when the parking brake is engaged and/or released is evaluated, to the effect that values of the locking force which have been determined in advance are acquired.

There is provision here that the values which are determined in advance are acquired by acquiring turning points in the signal profile of the current consumption of the electromechanical actuator, which turning points are evaluated in order to determine the set locking force and/or in order to determine the position of the brake element.

In one preferred embodiment of the method according to aspects of the invention, the gradient of the signal profile of the current consumption of the electromechanical actuator is acquired and evaluated in order to determine the set locking force and/or in order to determine the position of the brake element.

In one advantageous development of the method according to aspects of the invention there is provision that the absolute current value of the current consumption of the electromechanical actuator is acquired and is used to check the plausibility of the acquired locking force value.

A particularly advantageous development of the method according to aspects of the invention provides that the engagement and/or release of the parking brake is divided into phases, wherein the current consumption of the electromechanical actuator is evaluated for the purpose of phase detection.

In this context, the engagement of the parking brake is divided into a running up, a free running, an application phase, an engagement phase and a security phase, while the release of the parking brake is divided into a running up, a resetting phase, a running clearance phase, a free running phase and a stop phase.

The phases are determined using a model to which a learning procedure is fed in order to take into account ageing processes and wear processes. In the abovementioned model, further influencing parameters such as the temperature of the surroundings and the temperature of the rotor are taken into account and their influences are minimized.

These and other aspects of the invention are illustrated in detail by way of the embodiments and are described with respect to the embodiments in the following, making reference to the Figures.

BRIEF DESCRIPTION OF THE DRAWINGS

The invention will be explained in more detail below on the basis of two exemplary embodiments in conjunction with the appended drawing. In the drawing:

FIG. 2 is a diagram which shows the current consumption of the electromechanical actuator, the locking force and the position of the brake element plotted against time when the parking brake is engaged;

FIGS. 3a, b, c are illustrations of the division into phases of the current consumption of electromechanical actuator, the locking force and the rotational speed of the electromechanical actuator when the parking brake is engaged, and FIGS. 4a, b, c are an illustration, corresponding to FIGS. 3a to c, when the parking brake is released.

DETAILED DESCRIPTION OF THE PREFERRED EMBODIMENTS

Figure 1:
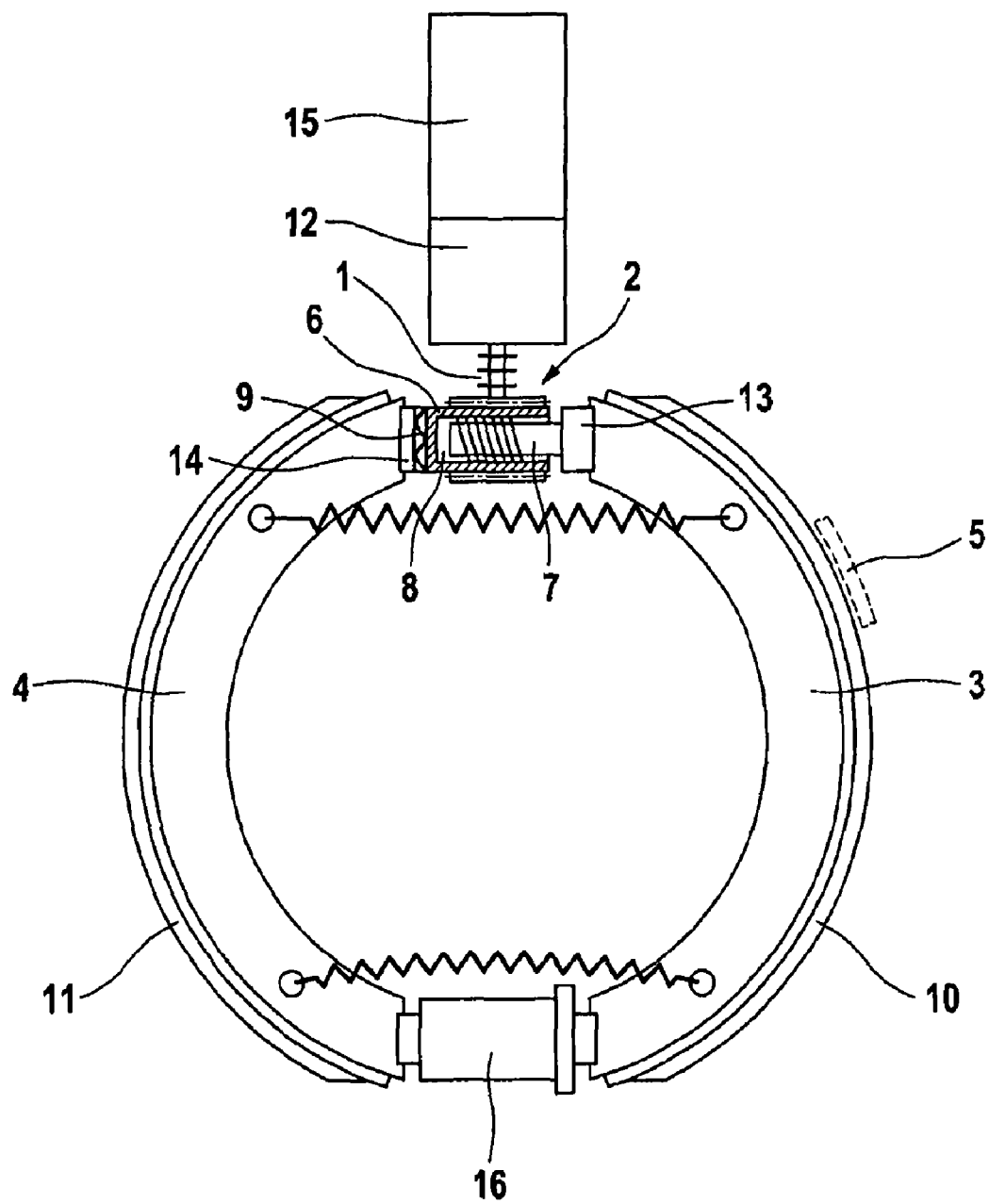
FIG. 1 is a schematic illustration of an electromechanically actuable parking brake for motor vehicles.

The present invention comprises both electromechanically actuable parking brakes which act on a disk brake, and parking brakes which act on a drum brake. Correspondingly, the method according to aspects of the invention can be engaged to these different parking brakes.

By way of example, an electromechanically actuable parking brake, which is composed essentially of a drum brake, known per se, of the "duo-servo" type and an electromechanical actuator 15, will be described on the basis of FIG. 1. The drum brake of the "duo-servo" type has a brake drum 5 which is illustrated only partially and which is permanently connected as a rotor 5 to a motor vehicle wheel, a pair of brake calipers 3, 4 which are provided with brake linings 10, 11 and which act as a brake element, and an actuating unit 2. The actuating unit 2 is embodied as an expanding lock 2, and it converts the rotational movement of the electromechanical actuator 15 into a translational movement and can cause the brake linings 10, 11 of the brake calipers 3, 4 to engage with the inside of the brake drum 5. A freely movable or floating-mounted support device 16, which lies opposite the expanding lock 2 and is arranged between the brake calipers 3, 4, is characteristic of the drum brake of the "duo-servo" type. The expanding lock 2 mentioned above is formed essentially by a threaded nut-spindle arrangement 8 and two pressure elements 13, 14, with the one pressure element 13 interacting with the spindle 7 and the other pressure element 14 interacting with the threaded nut 6. As is clarified in FIG. 1, the threaded nut-spindle arrangement 8 is actuated by a helical gear 1 which is driven by the electromechanical actuator 15 with the intermediate connection of a step down gear mechanism 12 (illustrated only schematically). For this purpose, the threaded nut 6 has, on the outer surface, a toothing which runs parallel to the axis of the threaded nut 6. The abovementioned helical wheel 1 forms a helical wheel transmission with this straight toothing of the threaded nut 6. When the helical gear 1 is actuated by the electromechanical actuator 15, the threaded nut 6 is made to rotate. Owing to this rotational movement of the threaded nut 6, the spindle 7 of the threaded nut-spindle arrangement 8 carries out a translational movement and causes the two brake calipers 3, 4 to engage with the brake drum 5 with the desired locking force.

In order to be able to carry out a parking brake process, either the step down gear mechanism 12 or the threaded nut-spindle arrangement 8 are of self-locking design. As a result of this measure, the brake calipers 3, 4 remain in engagement with the brake drum 5 in the currentless state of the electromechanical actuator 15.

If the motor vehicle is parked on a slope, a slight movement of the motor vehicle occurs in the direction of the downhill slope force after the desired engagement force has been set. In this context, the brake drum 5 also turns through a specific angular value until the self-reinforcing effect which is characteristic of a drum brake of the "duo-servo" type occurs. However, as a result, the desired engagement force is reduced. For this reason, there is provision that in the force flux between the threaded nut-spindle arrangement 8 and the pressure element 14 which interacts with the threaded nut 6 a spring element 9 is arranged which compensates the above-described reduction in the desired engagement force. Furthermore it is possible that a release process of the parking brake cannot be carried out if the previously heated brake drum 5 cools. During this cooling, the brake drum 5 experiences a small degree of shrinkage, after which the engagement force increases owing to the high degree of rigidity of the components which are located in the force flux. In this case it is possible that the electromechanical actuator 15 will not be able to carry out a release process of the parking brake since the engagement force is too large and the components which are located in the force flux have jammed. The above-mentioned arrangement which is illustrated in FIG. 1 also prevents this effect. At the same time, the spring element serves to change the current consumption of the electromechanical actuator in such a way that values of the blocking force which have been determined in advance can be acquired, as will be explained in more detail below on the basis of FIG. 2.

As has already been mentioned at the beginning, the invention and the method according to aspects of the invention also apply to an electromechanically actuable parking brake which acts on a disk brake. Here, the brake element is formed by a brake piston which is moved by an actuating unit which is embodied as a threaded nut-spindle unit, as a result of which a brake lining which is connected to the brake piston is pressed against the brake disk which acts as a rotor.

In FIG. 2, a characteristic profile of the parking brake F, with the position S of the brake element and of the brake calipers 3, 4, of the current consumption I and of the voltage U when the parking brake is engaged. Of these measurement variables, only the current consumption I is available during the present method. It is not absolutely necessary to know values of the current consumption I—an approximate profile is sufficient for the present method. In order to explain the present method better, the other aforesaid measurement variable which are not available while the electromechanically actuable parking brake is operating are plotted on the ordinant, while the time t is represented on the abscissa. The locking force F is represented by a dashed line, the positioning S of the brake calipers 3, 4 is represented by a dot-dashed line and the current consumption I of the electromechanical actuator 15 is represented by a chain of "plus sign" symbols. The voltage supply U is represented as a continuous line.

At the start of the time profile which is illustrated in FIG. 2, the parking brake is in the released state, i.e. the position of the brake calipers 3, 4 is "zero", and the locking force is also "zero" as is illustrated at position 20 at time to. Position 21 shows that at the start of an engagement process a comparatively high run up current. At the time $t_1$ this run up phase ends and is followed at the time $t_2$ by what is referred to as the engagement phase. At the time $t_2$, the brake linings 10, 11 are engaged to the brake drum 5 and accordingly during the further movement or spreading of the brake calipers 3, 4, as illustrated in position 23, the locking force F rises. The locking force F rises during the engagement phase up to the time $t_3$ with a first gradient. The current consumption I runs virtually parallel. Then, at the time $t_3$, the gradient of the locking force F turns down and the profile of the current consumption I describes a turning point at the position 23. At this time $t_3$, the locking force is so high that the spring packet 9 is compressed. Since the spring packet 9 is prestressed, the magnitude of the locking force F at the time $t_3$ is known. If the spring packet is prestressed, for example, to 2000 M, the locking force F at the time $t_3$ is also 2000 M. The further spreading of the brake calipers 3, 4 leads to further compression of the spring packet 9. The locking force F no longer rises so strongly between the time $t_3$ as $t_4$ as between the times $t_2$ and $t_3$ since the locking force of the spring packet 9 is absorbed. At the time $t_4$, the spring packet 9 is completely compressed and is pressed to the blocking point. The current consumption describes a turning point at the time $t_4$ and accordingly follows, virtually in parallel, the locking force F which in turn rises strongly.

At the time $t_5$, the current consumption I reaches the maximum available current value $I_{max}$. At the same time, no further movement or spreading of the brake calipers 3, 4 occurs and the position S of the brake calipers 3, 4 no longer changes after the time $t_5$. Since the brake calipers 3, 4 are no longer spread further apart, the locking force F also no longer increases after the time $t_5$.

The decisive factor is that the spring packet 9 changes the current consumption I of the electromechanical actuator 15 in such a way that values of the locking force which were determined in advance, specifically the force value to which the spring packet 9 is prestressed and the force value which is necessary to press the spring packet 9 to the blocking point can be acquired. These significant changes at the positions 23 and 24 can be acquired in the current consumption of the electromechanical actuator.

The above-described significant change in the current consumption of the electromechanical actuator 15 is brought about in the described exemplary embodiment by means of the prestressed disk spring packet 9. This disk spring packet 9 is located in the force flux of the parking brake and it influences the rigidity of the entire parking brake. A prestressed torsion spring, which is arranged in the torque flux of the parking brake, is also suitable for bringing about the described change in the current consumption of the electromechanical actuator 15.

A further possible way of bringing about a significant change in the current consumption of the electromechanical actuator 15 is to influence the component rigidity profile in a selective fashion, for example by weakening cross sections, in such a way that at a defined level of load an enlarged cross section enters the force flux and the rigidity therefore increases suddenly. Alternatively or additionally it is conceivable to use a slip clutch which predefines a maximum locking force before the clutch slips. A method for detecting the operation of a slip clutch is known from WO 2006/024635.

The acquisition of the positions 23 and 24 in the current consumption, which corresponds to values of the locking force which were acquired in advance or to a specific position of the brake calipers 3, 4, is carried out by acquiring these turning points 23, 24 in the signal profile. The different gradients of the signal profile between the times $t_2$ and $t_3$, between $t_3$ and $t_4$ and $t_4$ and $t_5$ is also acquired and is used to determine the set locking force F. In order to check the plausibility, the absolute current value is measured and is compared with values which have been acquired in advance. In this context, it is useful to divide the current consumption into phases, and in this context phase detection is subsequently carried out, as is explained in more detail with reference to FIGS. 3a to 3c.

FIG. 3a illustrates the current consumption, described on the basis of FIG. 2, of the electromechanical actuator 15, while FIG. 3b illustrates the set locking force. FIG. 3c illustrates the number of revolutions of the electromechanical actuator. The engagement of the parking brake is divided into a run up phase (phase 1), a freely running phase (phase 2), an application phase (phase 3), an engagement phase (phase 4) and a securing phase (phase 5). In the run up phase/phase 1, the electromechanical actuator 15 runs up. If less and less current is absorbed in this phase, i.e. there is a negative gradient but no constant current consumption, a locking force is not present. The locking force is equal to zero and the pressure elements 13, 14. If the run up phase/phase 1 is detected and a comparatively low current consumption remains constant for a certain time, the freely running phase which is referred to as phase 2 is detected. There is still then no locking force or only a low locking force present.

If the current consumption of the electromechanical actuator 15 exceeds a certain threshold in the freely running phase/phase 2 and rises slightly, for example continuously with a relatively low gradient, the engagement phase, which is characterized as phase 3, is detected. The engagement phase is referred to as phase 4 and is detected if the current consumption in the engagement phase/phase 3 continues to rise strongly in a linear fashion. In the engagement phase/phase 4, the spring element ensures that different gradients occur taking into account the bending points. The current profile and force profile in the engagement phase/phase 4 are dependent on the configuration of the spring element used and can assume different shapes. Subsequently, the securing phase which is referred to as phase 5 and the maximum setting of current consumption are reached, said setting serving to secure the clamping force which is reached in the engagement phase/phase 4. The constant current profile in the securing phase 5 is brought about by a current limiting means.

FIGS. 4a to 4c correspondingly show a release process of the electromechanically actuable parking brake. The release of parking brake is divided into a run up phase (phase 1), a resetting phase (phase 2), a running clearance phase (phase 3), a freely running phase (phase 4) and a stop phase (phase 5).

5 phases have to be respectively run through during an engagement and release process. The phase 5, the stop phase, during a release process is very important in order to detect unambiguously that the parking brake has been completely released. The disadvantage here is that the time which is required for the engagement is as a result longer, and also the durability of the electromechanical actuator 15 and of other parts has to be greater. Therefore there is provision for the electromechanical actuator 15 to be switched off after a certain time during the phase 4, the freely running phase. The switched-off time is dependent on a large number of parameters, taking into the time intervals of the phases of the last engagement process such as, for example, the time to overcome the running clearance in the last engagement process.

The phase 5 will be set in a release process if it is not clear that the brake is completely released, or in order to acquire the running clearance time, for example after a specific number of actuations. In order shorten the engagement time during a release process despite phase 5, the electromechanical actuator 15 is moved forward briefly after the end of the phase 5, i.e. actuated briefly in the opposite direction.

The electromechanical actuator 15 is not moved as far as the stop during a release process without phase 5 and the force of the electromechanical actuator is therefore zero just before the end of the phase 4.

During system development, in addition to measurement of the current consumption of the electromechanical actuator 15, the locking force is measured in accordance with FIGS. 3b and 4b, and the rotational speed of the electromechanical actuator 15 is measured in accordance with FIGS. 3c and 4c. As a result, characteristic curves of the current consumption, of the locking force and of the rotational speed are stored, said characteristic curves serving to determine the set locking force and to determine the position of the brake calipers 3, 4. An overall model which estimates the instantaneous engaged locking force or the position of the brake element during an engagement process or release process and the end of the process, that is to say whether the parking brake is engaged or released, is unambiguously detected from the characteristic curves for the current consumption, the locking force and the rotational speed.

This overall model takes into account the influencing parameters such as rotor temperature, external temperature, load collective, voltage supply, by recording, for example, current locking force/rotational speed characteristic curves under various external conditions.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. An electromechanically actuable parking brake for motor vehicles comprising:
at least one electromechanical actuator whose rotational movement is converted into a translational movement by an actuating unit, and which moves at least one brake element such that at least one brake lining which is connected to the brake element is pressed with a locking force against a rotor which is connected to a motor vehicle wheel, and
means for causing turning points in the current consumption of the electromechanical actuator as the brake lining is moved toward the rotor, wherein values of the locking force at the turning points in the current consumption are pre-determined such that the values of the locking force are known at the occurrence of the turning points.

2. The electromechanically actuable parking brake as claimed in claim 1, wherein the causing means are configured to bring about a significant change in the current consumption of the electromechanical actuator when the parking brake is engaged or released, which said significant change permits a value of the locking force which was pre-determined to be inferred.

3. The electromechanically actuable parking brake as claimed in claim 2, wherein the causing means comprise at least one prestressed spring element which influences the rigidity of the parking brake.

4. The electromechanically actuable parking brake as claimed in claim 3, wherein the at least one spring element is embodied as a prestressed disk spring package in a force flux of the parking brake or as a prestressed torsion spring in the torque flux of the parking brake.

5. The electromechanically actuable parking brake as claimed in claim 2, wherein the causing means are formed by at least one slip clutch.

6. A method for operating an electromechanically actuable parking brake for motor vehicles having at least one electromechanical actuator, said method comprising the steps of:
(a) converting rotational movement of the at least one electromechanical actuator into a translational movement by an actuating unit;
(b) moving at least one brake element such that at least one brake lining which is connected to the brake element is pressed with a locking force against a rotor which is permanently connected to a motor vehicle wheel;
(c) causing turning points in a current consumption of the electromechanical actuator as the brake lining is moved toward the rotor; and
(d) evaluating the current consumption of the electromechanical actuator to identify the turning points in the current consumption, wherein values of the locking force at the turning points are pre-determined such that the values of the locking force are known at the occurrence of the turning points.

7. The method as claimed in claim 6, wherein step (d) comprises
evaluating the turning points in order to determine a position of the brake element, or the locking force and the position of the brake element.

8. The method as claimed in claim 7, wherein step (d) further comprises
acquiring a positive gradient of the signal profile of the current consumption of the electromechanical actuator, and
evaluating the positive gradient in order to determine (i) the set locking force, (ii) the position of the brake element, or (iii) the set locking force and the position of the brake element.

9. The method as claimed in claim 6, wherein an engagement or a release of the parking brake is divided into phases, wherein the current consumption of the electromechanical actuator is evaluated for the purpose of phase detection.

10. The method as claimed in claim 9, wherein the engagement of the parking brake is divided into a running up (phase 1), a free running (phase 2), an application phase, an engagement phase and a security phase (phase 5), while the release of the parking brake is divided into a running up (phase 1), a resetting phase (phase 2), a running clearance phase (phase 3), a free running phase (phase 4) and a stop phase (phase 5).

11. The method as claimed in claim 10, wherein the phases are determined using a model to which a learning procedure is fed in order to take into account aging processes and wear processes.

12. The method as claimed in claim 6, wherein prior to step (d), the method further comprises the step of acquiring a current consumption of the electromechanical actuator when the parking brake is engaged, released or both.

13. The method as claimed in claim 12, wherein the acquiring step comprises acquiring an absolute current value of the current consumption of the electromechanical actuator for checking the plausibility of an acquired locking force value.

* * * * *